US012738132B2

(12) United States Patent
Ewing et al.

(10) Patent No.: US 12,738,132 B2
(45) **Date of Patent: *Sep. 15, 2026**

(54) ANTI-THEFT DEVICE WITH CABLE ATTACHMENT

(71) Applicant: Fasteners for Retail, Inc., Twinsburg, OH (US)

(72) Inventors: Brent Ewing, Roscoe, IL (US); Chan Chor Man, Tai Po (HK)

(73) Assignee: Fasteners for Retail, Inc., Twinsburg, OH (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/912,262

(22) Filed: Oct. 10, 2024

(65) Prior Publication Data

US 2025/0037554 A1 Jan. 30, 2025

Related U.S. Application Data

(63) Continuation of application No. 18/330,025, filed on Jun. 6, 2023, which is a continuation of application (Continued)

(51) Int. Cl.
*G08B 13/14* (2006.01)
*G08B 7/06* (2006.01)
*G08B 21/18* (2006.01)

(52) U.S. Cl.
CPC .......... *G08B 13/1445* (2013.01); *G08B 7/06* (2013.01); *G08B 21/182* (2013.01)

(58) Field of Classification Search
CPC .... G08B 13/1445; G08B 7/06; G08B 21/182; G08B 13/1481; G08B 29/046; G08B 13/1436; G08B 13/22
See application file for complete search history.

(56) References Cited

U.S. PATENT DOCUMENTS 3,945,706 A 3/1976 Steiner et al.
4,383,242 A 5/1983 Sassover et al.
(Continued)

FOREIGN PATENT DOCUMENTS

CN 101310311 A 11/2008
CN 102439642 A 5/2012
(Continued)

OTHER PUBLICATIONS

Indyme smartresponse; 2 pages printed from internet http://www.indyme.com/; date last visited Apr. 8, 2013.
U.S. Appl. No. 18/330,025, filed Jun. 6, 2023.

*Primary Examiner* — Toan N Pham
(74) *Attorney, Agent, or Firm* — Reinhart Boerner Van Deuren P.C.

(57) ABSTRACT

A theft detection device, for coupling to a merchandise product, includes a housing with a first end of a conductive strap attached to the housing. The housing has an opening for a second end of the conductive strap. The conductive strap secures the theft detection device to the product, and activated when the second end of the conductive strap is inserted into the opening. A light sensor, within the housing, senses the amount of light shining on the detection device. A motion sensor, within the housing, senses movement of the detection device. An emitter, within the housing, provides audio signals to a user. A microcontroller, within the housing, is coupled to the light sensor, the motion sensor, and the emitter. The emitter emits an alarm based on data from the light and motion sensors. The emitter emits an alarm when the conductive strap is cut or loosened from the product.

9 Claims, 6 Drawing Sheets

Related U.S. Application Data

No. 17/366,848, filed on Jul. 2, 2021, now Pat. No. 11,727,773, which is a continuation of application No. 16/838,900, filed on Apr. 2, 2020, now Pat. No. 11,087,601.

(56) References Cited

U.S. PATENT DOCUMENTS

| | | | | |
|---|---|---|---|---|
| D271,302 | S | 11/1983 | Manning et al. | |
| 4,462,023 | A | 7/1984 | Nielsen et al. | |
| 4,996,515 | A | 2/1991 | Schaffer et al. | |
| 5,068,643 | A | 11/1991 | Yashina | |
| 5,086,641 | A | 2/1992 | Roselli | |
| 5,168,263 | A | 12/1992 | Drucker | |
| 5,317,304 | A | 5/1994 | Choi | |
| 5,434,559 | A | 7/1995 | Smiley et al. | |
| 5,469,135 | A | 11/1995 | Solow | |
| 5,570,080 | A | 10/1996 | Inoue et al. | |
| D385,531 | S | 10/1997 | Hermes et al. | |
| 5,757,270 | A | 5/1998 | Mori | |
| 5,815,066 | A | 9/1998 | Pumilia | |
| 5,838,225 | A | 11/1998 | Todd | |
| 5,905,438 | A | 5/1999 | Weiss et al. | |
| 5,955,951 | A | 9/1999 | Wischerop et al. | |
| 5,965,954 | A | 10/1999 | Johnson et al. | |
| 5,977,654 | A | 11/1999 | Johnson et al. | |
| 5,979,674 | A | 11/1999 | Thalenfeld | |
| 6,049,268 | A | 4/2000 | Flick | |
| 6,133,830 | A | 10/2000 | D'Angelo et al. | |
| 6,373,381 | B2 | 4/2002 | Wu | |
| 6,517,000 | B1 | 2/2003 | McAllister et al. | |
| 6,628,344 | B1 | 9/2003 | Weber | |
| 6,690,411 | B2 | 2/2004 | Naidoo et al. | |
| 6,967,578 | B1 | 11/2005 | Guida | |
| 7,174,176 | B1 | 2/2007 | Liu | |
| 7,210,164 | B1 | 4/2007 | Jandrell | |
| 7,239,238 | B2 | 7/2007 | Tester et al. | |
| 7,258,461 | B1 | 8/2007 | Izardel | |
| 7,530,188 | B2 | 5/2009 | Beilenhoff et al. | |
| 7,584,930 | B2 | 9/2009 | Zich | |
| 7,591,422 | B2 | 9/2009 | Maitlin | |
| 7,671,741 | B2 | 3/2010 | Lax et al. | |
| 7,671,742 | B2 | 3/2010 | Fallin et al. | |
| 7,768,399 | B2 | 8/2010 | Hachmann et al. | |
| 7,916,020 | B2 | 3/2011 | Seidel | |
| 7,969,305 | B2 | 6/2011 | Belden, Jr. et al. | |
| 8,103,047 | B1 | 1/2012 | Griess et al. | |
| 8,139,945 | B1 | 3/2012 | Amir et al. | |
| 8,274,391 | B2 | 9/2012 | Yang | |
| 8,368,542 | B2 | 2/2013 | Yang | |
| 8,373,564 | B2 | 2/2013 | Wyatt, Jr. et al. | |
| 8,378,823 | B2 | 2/2013 | Eckert et al. | |
| 8,378,826 | B2 | 2/2013 | Mercier et al. | |
| D679,657 | S | 4/2013 | Richards et al. | |
| D679,658 | S | 4/2013 | Richards et al. | |
| 8,534,469 | B2 | 9/2013 | Northrup, Jr. et al. | |
| 8,629,772 | B2 | 1/2014 | Valiulis et al. | |
| D705,178 | S | 5/2014 | Olsson et al. | |
| 8,749,194 | B1 | 6/2014 | Kelsch et al. | |
| 8,833,116 | B1 | 9/2014 | Brown | |
| 8,884,761 | B2 | 11/2014 | Valiulis | |
| 9,009,773 | B1 | 4/2015 | Hendricks et al. | |
| 9,324,220 | B2 | 4/2016 | Valiulis | |
| 9,495,856 | B2 | 11/2016 | Brenner | |
| 9,549,544 | B1 | 1/2017 | Millsap | |
| 10,309,663 | B1 | 6/2019 | Taber et al. | |
| 10,885,753 | B2 | 1/2021 | Ewing et al. | |
| 11,087,601 | B1 * | 8/2021 | Ewing | G08B 13/1481 |
| 11,727,773 | B2 * | 8/2023 | Ewing | G08B 29/046 340/568.2 |
| 12,148,275 | B2 * | 11/2024 | Ewing | G08B 13/1436 |
| 2002/0067259 | A1 | 6/2002 | Fufidio et al. | |
| 2002/0130776 | A1 | 9/2002 | Houde | |
| 2002/0188866 | A1 | 12/2002 | Ca et al. | |
| 2003/0030548 | A1 | 2/2003 | Kovacs et al. | |
| 2003/0175004 | A1 | 9/2003 | Garito et al. | |
| 2003/0227382 | A1 | 12/2003 | Breed | |
| 2004/0145477 | A1 | 7/2004 | Easter et al. | |
| 2005/0104733 | A1 | 5/2005 | Campero | |
| 2005/0261816 | A1 | 11/2005 | DiCroce et al. | |
| 2006/0198611 | A1 | 9/2006 | Park | |
| 2007/0080806 | A1 | 4/2007 | Lax et al. | |
| 2007/0115100 | A1 | 5/2007 | Mandle | |
| 2007/0171059 | A1 | 7/2007 | Pistilli | |
| 2009/0079557 | A1 | 3/2009 | Miner | |
| 2009/0095695 | A1 | 4/2009 | Moock et al. | |
| 2009/0109027 | A1 | 4/2009 | Schuller | |
| 2009/0308494 | A1 | 12/2009 | Linn | |
| 2010/0097223 | A1 | 4/2010 | Kruest et al. | |
| 2010/0175438 | A1 | 7/2010 | Sankey | |
| 2010/0238031 | A1 | 9/2010 | Belden, Jr. et al. | |
| 2011/0062794 | A1 | 3/2011 | Vergoossen et al. | |
| 2011/0068921 | A1 | 3/2011 | Shafer | |
| 2011/0121973 | A1 | 5/2011 | Yang | |
| 2011/0215060 | A1 | 9/2011 | Niederhuefner | |
| 2011/0227735 | A1 | 9/2011 | Fawcett et al. | |
| 2011/0310307 | A1 | 12/2011 | Takahashi | |
| 2012/0287090 | A1 | 11/2012 | Cacioppo | |
| 2013/0057524 | A1 | 3/2013 | Bertin et al. | |
| 2013/0142494 | A1 | 6/2013 | Valiulis et al. | |
| 2014/0055264 | A1 | 2/2014 | Valiulis et al. | |
| 2014/0055266 | A1 | 2/2014 | Valiulis | |
| 2014/0070948 | A1 | 3/2014 | Valiulis et al. | |
| 2015/0042178 | A1 | 2/2015 | Kim | |

FOREIGN PATENT DOCUMENTS

| | | | |
|---|---|---|---|
| CN | 103503040 | A | 1/2014 |
| CN | 106571000 | A | 4/2017 |
| DE | 102011012163 | A1 | 8/2012 |
| EP | 2584547 | A1 | 4/2013 |
| KR | 100823026 | B1 | 4/2008 |
| KR | 20100137956 | A | 12/2010 |
| KR | 2020110002261 | U | 3/2011 |
| KR | 20110043837 | A | 4/2011 |
| KR | 20110080411 | A | 7/2011 |
| WO | WO 2001/081988 | A2 | 11/2001 |
| WO | WO 2009/100857 | A1 | 8/2009 |
| WO | WO 2011/025085 | A1 | 3/2011 |
| WO | WO 2012/113536 | A1 | 8/2012 |

* cited by examiner

ANTI-THEFT DEVICE WITH CABLE ATTACHMENT

CROSS-REFERENCE TO RELATED PATENT APPLICATION

This patent application is a continuation of co-pending U.S. patent application Ser. No. 18/330,025, filed Jun. 6, 2023, which is a continuation of U.S. patent application Ser. No. 17/366,848, filed Jul. 2, 2021, and issued as U.S. Pat. No. 11,727,773 on Aug. 15, 2023, which is a continuation of U.S. patent application Ser. No. 16/838,900, filed Apr. 2, 2020, and issued as U.S. Pat. No. 11,087,601 on Aug. 10, 2021, the entire teachings and disclosures of which are incorporated herein by reference thereto.

FIELD OF THE INVENTION

This invention generally relates to anti-theft devices, and more particular anti-theft devices associated with retail merchandise, and even more particularly to cable wrap style anti-theft devices.

BACKGROUND OF THE INVENTION

Anti-theft devices are widely employed in the contemporary retail merchandise environment and come in a variety of forms. Some devices are associated with a retail display such that removal of retail merchandise from the display may trigger an alarm if certain alarm conditions are met. For non-limiting example, such displays may provide an alarm when a predetermined number of retail merchandise items are removed in rapid succession.

Other devices may attach directly to retail merchandise, and provide an alarm when certain alarm conditions are met. Some of these attached anti-theft devices may sound an alarm when an invisible boundary is exceeded, such as the entry way of a retail merchandise store. Others may sound an alarm if they detect motion, changes in light, etc.

Once such anti-theft device used to attach directly to retail merchandise is the cable wrap device, or simply a cable wrap. Such cable wraps may utilize a cable or other flexible member to wrap around an item of retail merchandise packaging and affix an anti-theft device thereto. Such cable wraps are often used for irregularly shaped packaging.

An anti-theft device included with the cable wrap may include provisions to detect whether a theft condition has occurred. Such conditions may include removal of the retail merchandise item from the store, concealment of the retail merchandise item, or unauthorized removal of the anti-theft device from the item of retail merchandise by severing the cable, etc. An anti-theft devices are disclosed in U.S. Pat. No. 8,884,761, entitled, "Theft Detection Device and Method for Controlling"", issued on Nov. 11, 2014, and in U.S. patent application Ser. No. 13/591,040, entitled, "Theft Detection System", filed on Aug. 21, 2012, both of which are incorporated herein by reference in their entireties.

Embodiments of the invention described herein provide an improvement to conventional anti-theft devices. These and other advantages of the invention, as well as additional inventive features, will be apparent from the description of the invention provided herein.

BRIEF SUMMARY OF THE INVENTION

In one aspect, embodiments of the invention provide a theft detection device configured to be coupled to a merchandise product. The theft detection device includes a housing with a first end of an electrically conductive strap attached to the housing. The housing has an opening for a second end of the conductive strap. The conductive strap is configured to secure the theft detection device to the merchandise product. The theft detection device is activated when the second end of the conductive strap is inserted into the opening. A light sensor is disposed within the housing. The light sensor is configured to sense the amount of light shining on the theft detection device. A motion sensor is disposed within the housing. The motion sensor is configured to sense movement of the theft detection device. An emitter is disposed within the housing. The emitter is configured to provide audio signals to a user. A microcontroller is disposed in the housing and coupled to the light sensor, the motion sensor, and the emitter. The microcontroller is configured to control the emitter to emit an alarm signal based on data from the light and motion sensors. The microcontroller is also to cause the emitter to emit an alarm signal when the conductive strap is cut or loosened from the merchandise product.

In a particular embodiment, the theft detection device includes an installation switch which is closed when the conductive strap is inserted into the opening. Further, the installation switch may be opened when the conductive strap is cut. Embodiments of the theft detection device include a decode switch which, when closed, opens the installation switch to deactivate the theft detection device. In certain embodiments, the decode switch is configured to be closed magnetically.

In a further embodiment, the installation switch includes a first metal contact, and a movable metal gear configured to engage the conductive strap to cause the conductive strap to come into electrical contact with the first metal contact. In some embodiments, the conductive strap includes a plurality of gears along a length of the conductive strap where the plurality of gears is configured to engage a mating gear set on the movable metal gear in order to lock the conductive strap in a fixed position. The theft detection device may also include a spring disposed in the housing, where the spring biases the movable metal gear into contact with the conductive strap.

In certain embodiments, the movable metal gear is configured to overcome a force of the spring in order to disengage the movable metal from the conductive strap in response to a magnet placed outside of the housing in close proximity to the movable metal gear. In a further embodiment, the conductive strap comes into electrical contact with a second metal contact when the movable metal gear disengages from the conductive strap.

The theft detection device may also include an RF circuit configured to transmit the alarm signal to a remote receiver. In particular embodiments, the RF circuit is configured to wirelessly transmit the alarm signal to the remote receiver. A low-voltage detection circuit may be configured to determine when the supply voltage for the microcontroller falls below a threshold value. Further, the microcontroller may be configured to cause the emitter to emit an alarm signal when the supply voltage for the microcontroller falls below the threshold value. In some embodiments, the alarm signal includes both an audio signal and a visual signal.

In another aspect, embodiments of the invention provide a method for preventing the theft of a merchandise product. The method calls for fixing a theft detection device to the merchandise product using an electrically conductive strap. The theft detection device has an installation switch. The theft detection device is activated when the conductive strap is used to close the installation switch. The method further includes using a motion sensor to sense movement of the theft detection device, using a light sensor to sense light shining on the theft detection device, and using a microcontroller to determine the occurrence of a theft condition for the merchandise product based on data from the light and motion sensors. The method also includes emitting an alarm signal when the microcontroller indicates a theft condition exists, and emitting the alarm signal when the conductive strap is cut or loosened from the merchandise product.

In certain embodiments, the microcontroller indicates a theft condition exists when it is determined that the theft detection device is in motion and the light sensed by the light sensor is below a threshold level. In a further embodiment, the method also includes deactivating the theft detection device by closing a decode switch disposed within a housing of the theft detection device. Closing the decode switch may include placing a magnet in close proximity to the decode switch. Furthermore, closing the decode switch may also open the installation switch.

In a particular embodiment, the step of placing a magnet in close proximity to the decode switch causes a movable metal gear configured to disengage from the conductive strap which causes the conductive strap to come into electrical contact with a second metal contact. In a more particular embodiment, closing the installation switch causes the movable metal gear to engage the conductive strap in order to force the conductive strap into electrical contact with a first metal contact. Causing the movable metal gear to engage the conductive strap may include using a spring, disposed in the housing, to force the movable metal gear into contact with the conductive strap. In a further embodiment, closing the installation switch includes the step of placing a plurality of gears along a length of the conductive strap, such that the plurality of gears engage a set of mating gears on the movable metal gear in order to lock the conductive strap in a fixed position.

In some embodiments, the method includes transmitting the alarm signal to a remote receiver using an RF circuit. In more particular embodiments, the method includes wirelessly transmitting the alarm signal to a remote receiver. The method may also include detecting when the supply voltage for the microcontroller falls below a threshold value. Further, the method may include emitting an alarm signal when the supply voltage for the microcontroller falls below the threshold value. In certain embodiments, emitting an alarm signal includes emitting both an audio signal and a visual signal. The method may also require pausing for a predetermined period of time before emitting the alarm signal.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Generally, one embodiment of a theft detection device shown in the figures as a merchandise tag is provided. In retail stores, thieves sometimes take products and place them into a bag, purse, or other enclosure, to hide the items. In such instances, low light levels around a product in conjunction with movement of the product may be indicative that the product is being stolen. A merchandise tag could be coupled to the product in order to detect low light levels and movement to determine when a potential theft condition exists.

Figure 1:
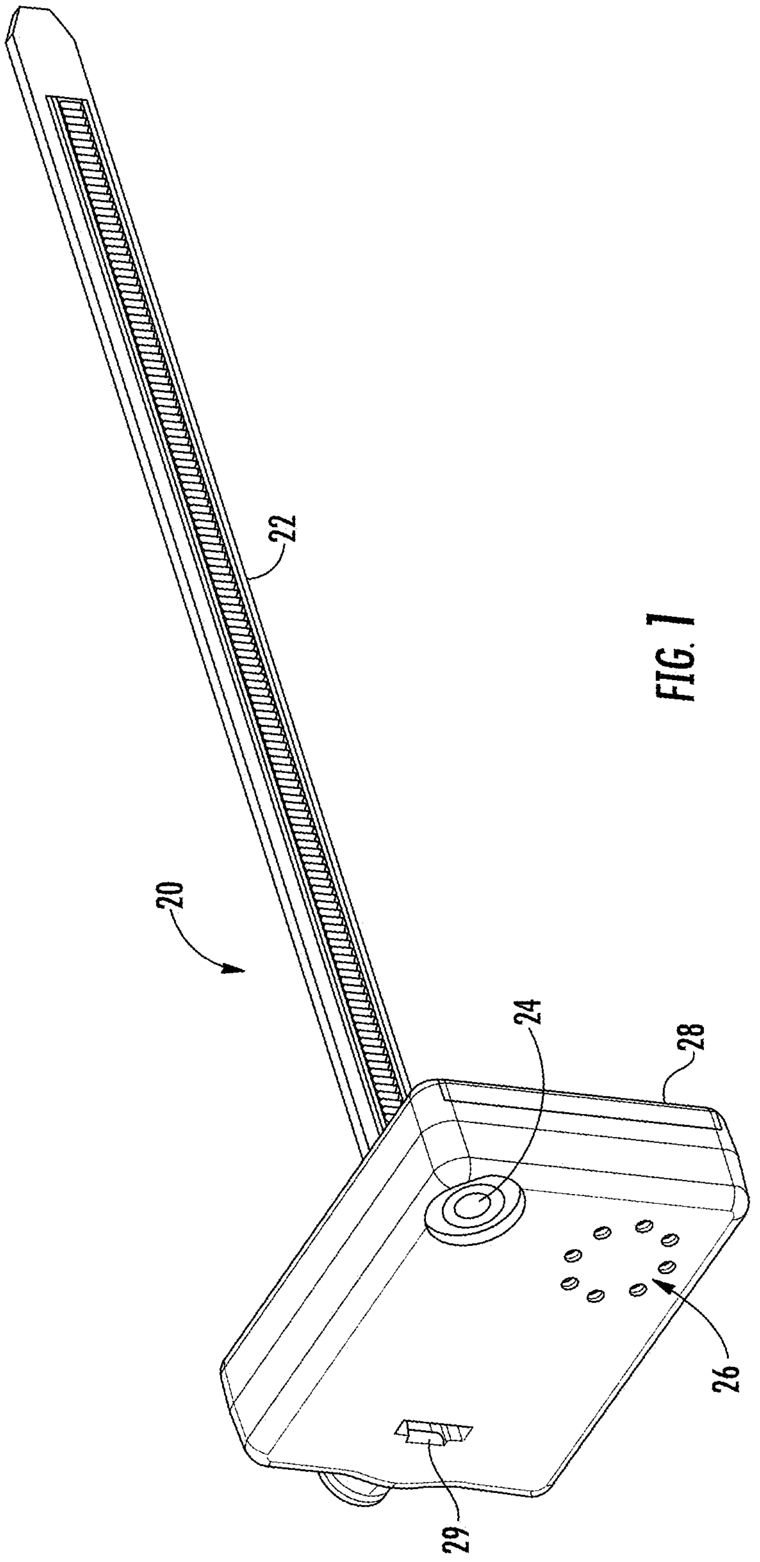
FIG. 1 is a perspective view of a retail anti-theft device constructed in accordance with an embodiment of the invention.
Figure 2:
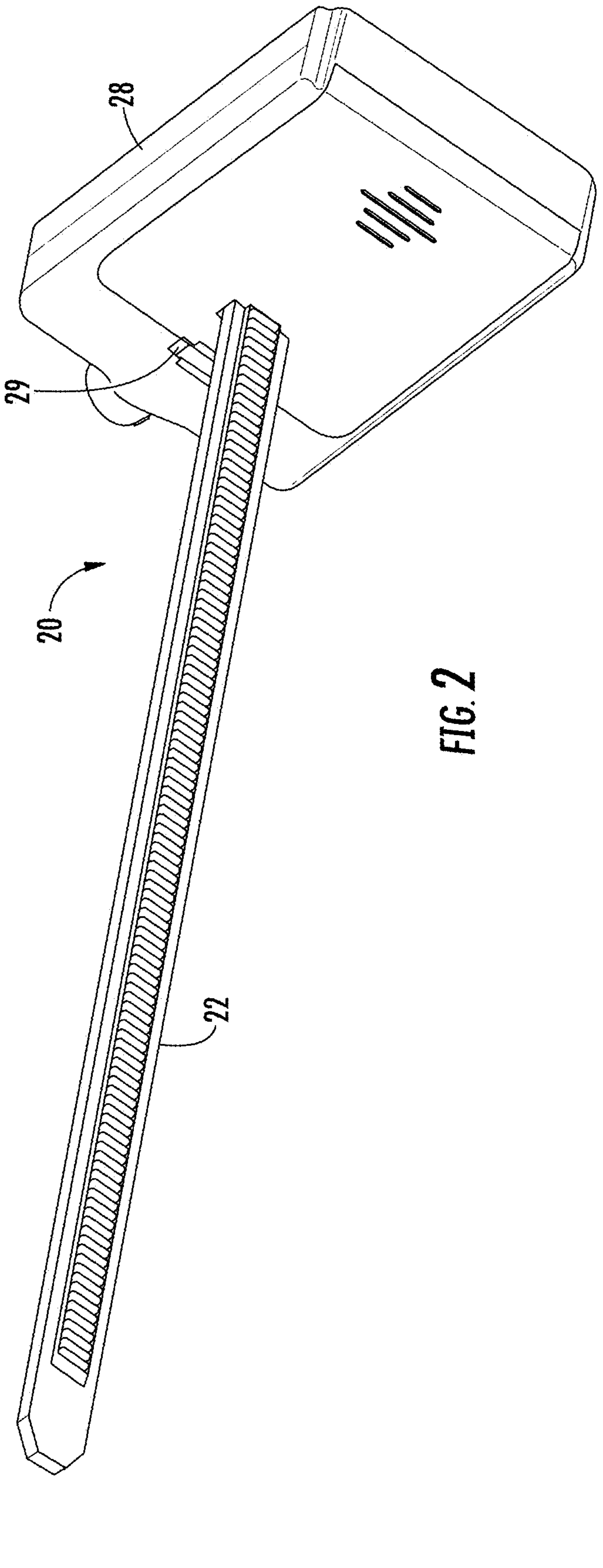
FIG. 2 is a perspective view of the retail anti-theft device of FIG. 1 showing another side of the anti-theft device.
Figure 3:
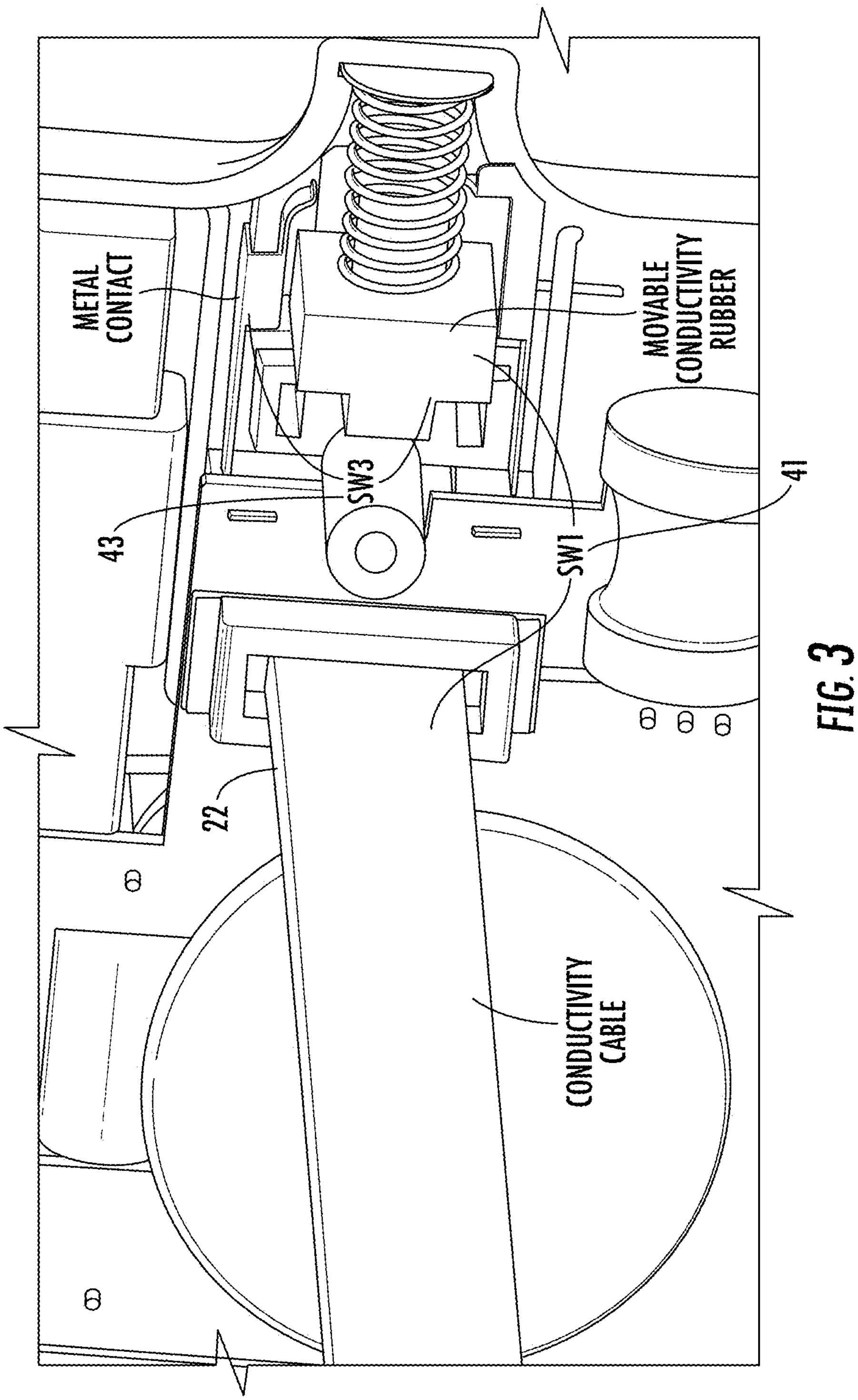
FIG. 3 is a perspective view of an interior portion of the retail anti-theft device, in accordance with an embodiment of the invention.

With reference to FIGS. 1-3, a theft detection device in the form of a merchandise tag 20, is illustrated in the perspective view. With respect to embodiments of the invention described herein, the terms "theft protection device" and "merchandise tag" may be used interchangeably. The merchandise tag 20 has a housing 28 and an attached electrically conductive strap 22. Using the conductive strap 22, the merchandise tag 20 may be attached to any type of retail or merchandise product to deter theft of that product. The free end of the conductive strap 22 is then inserted into an opening 29 in housing 28. Once inserted into opening 29, the conductive strap 22 completes an electrical circuit that is monitored by a microcontroller 34 (shown in FIG. 5). As will be explained below, a break in this circuit may provide indication of a theft thereby causing the microcontroller 34 to issue an alarm.

As illustrated in the embodiment of FIG. 1, the merchandise tag 20 may include a light sensor 24, and an emitter 26. The light sensor 24 and emitter 26 are incorporated into the housing 28. The light sensor 24 may be any suitable type of photocell, photo detector, photoresistor, light dependent resistor, or any other suitable type of light sensor. In various embodiments, the emitter 26 may be configured to emit audible sound signals, RF signals, AM signals, FM signals, microwave signals, combinations thereof, or any other suitable type of signal. Embodiments of the merchandise tag 20 also include an LED 25 (shown in FIG. 4) to provide visual cues, such as alarm or warning signals, to the user.

As explained above, the merchandise tag 20 is attached to the merchandise product by the conductive strap 22, which may be made from plastic or any other similarly suitable material. Moreover, the merchandise tag 20 is configured to be releasably attached to the merchandise product when one end of the conductive strap 22 is disconnected from the merchandise tag 20.

Figure 4:
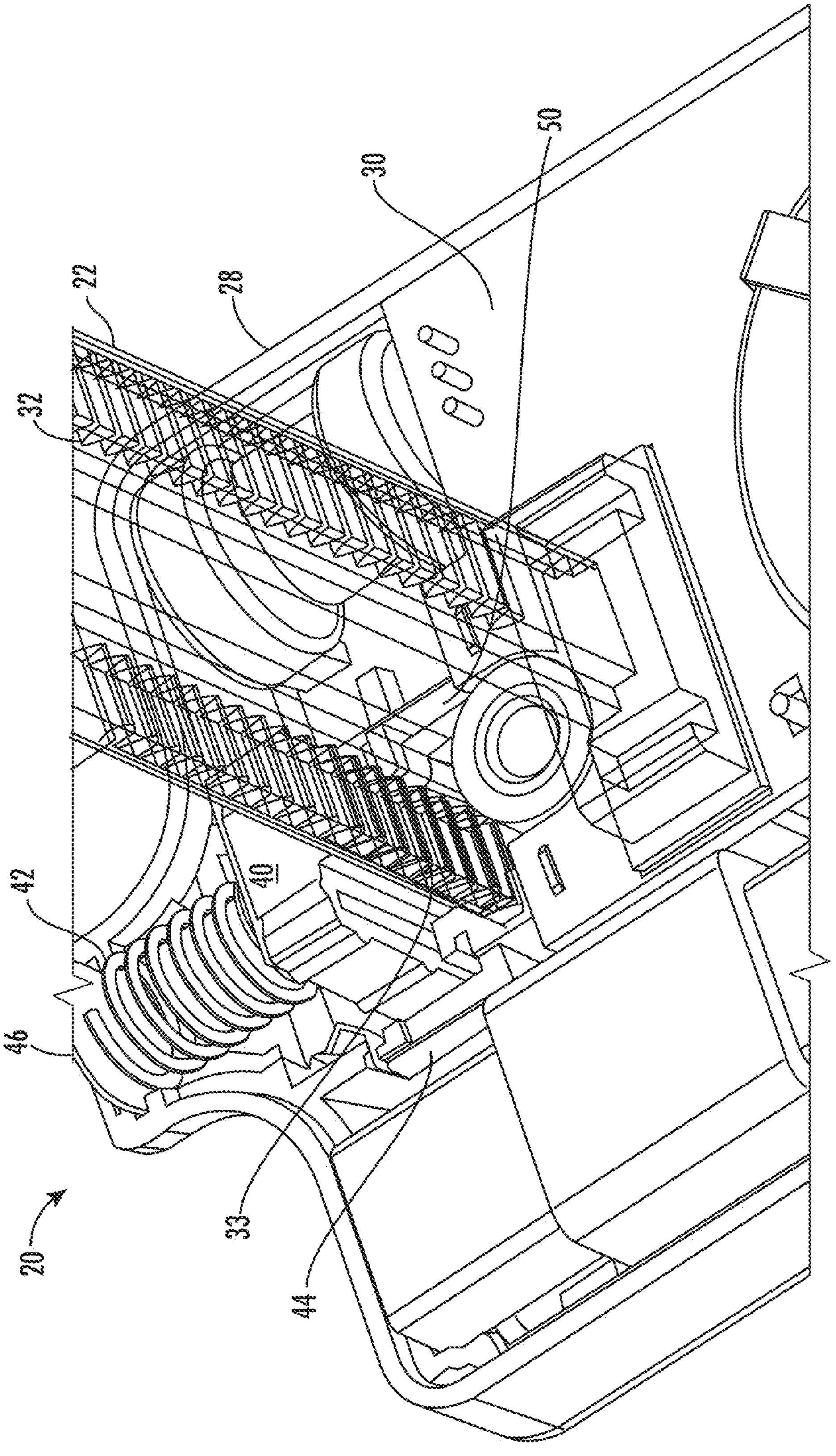
FIG. 4 is another perspective view of an interior portion of the retail anti-theft device, in accordance with an embodiment of the invention.

FIGS. 3 and 4 provide perspective views of an interior portion of the merchandise tag 20, in accordance with an embodiment of the invention. More specifically, the interior portion is within the housing 28 of the merchandise tag 20. More particularly, FIG. 3 shows a particular embodiment of an installation switch 41, also shown as SW1 on FIGS. 3 and 4, and a decode switch 43, also shown as SW3 on FIGS. 3 and 4.

In order to arm the merchandise tag 20, the conductive strap 22 is fastened to the PCB via the battery door locked in place by the screw to the product housing. The conductive strap 22 is in electrical contact with the circuit board 30 housed within the merchandise tag housing 28.

The free end of the conductive strap 22 is wrapped securely around the product being protected and returned back to the merchandise tag 20 where it is inserted through opening 29. Gears 32 on the conductive strap 22 are locked in place with the mating gear set 33 on a movable metal gear 40. The amount of the locking force is controlled by a spring 42 disposed in the housing 28 and which engages the movable metal gear 40. When locked in place in this fashion, the conductive strap 22 is in electrical contact with a first metal contact 44. Once the conductive loop described above is formed by locking the conductive strap 22 in place, any attempt to open the close loop (e.g., cut or remove the conductive strap 22) will sound the alarm.

In order to disarm the merchandise tag 20, a strong magnet is required to remove the conductive strap 22 from the product being protected without sounding the alarm. With the magnet applied to the tip 46 of the merchandise tag housing 28, the movable metal gear 40 moves upward releasing the locking gears 32, 33 between the conductive strap 22 and the movable metal gear 40. Using the magnet as described causes the movable metal gear 40 to engage a second metal contact 50, thus forming a closed loop with the first metal contact 44 signaling the microcontroller 34 on the circuit board 30 to perform the disarming function.

Figure 5:
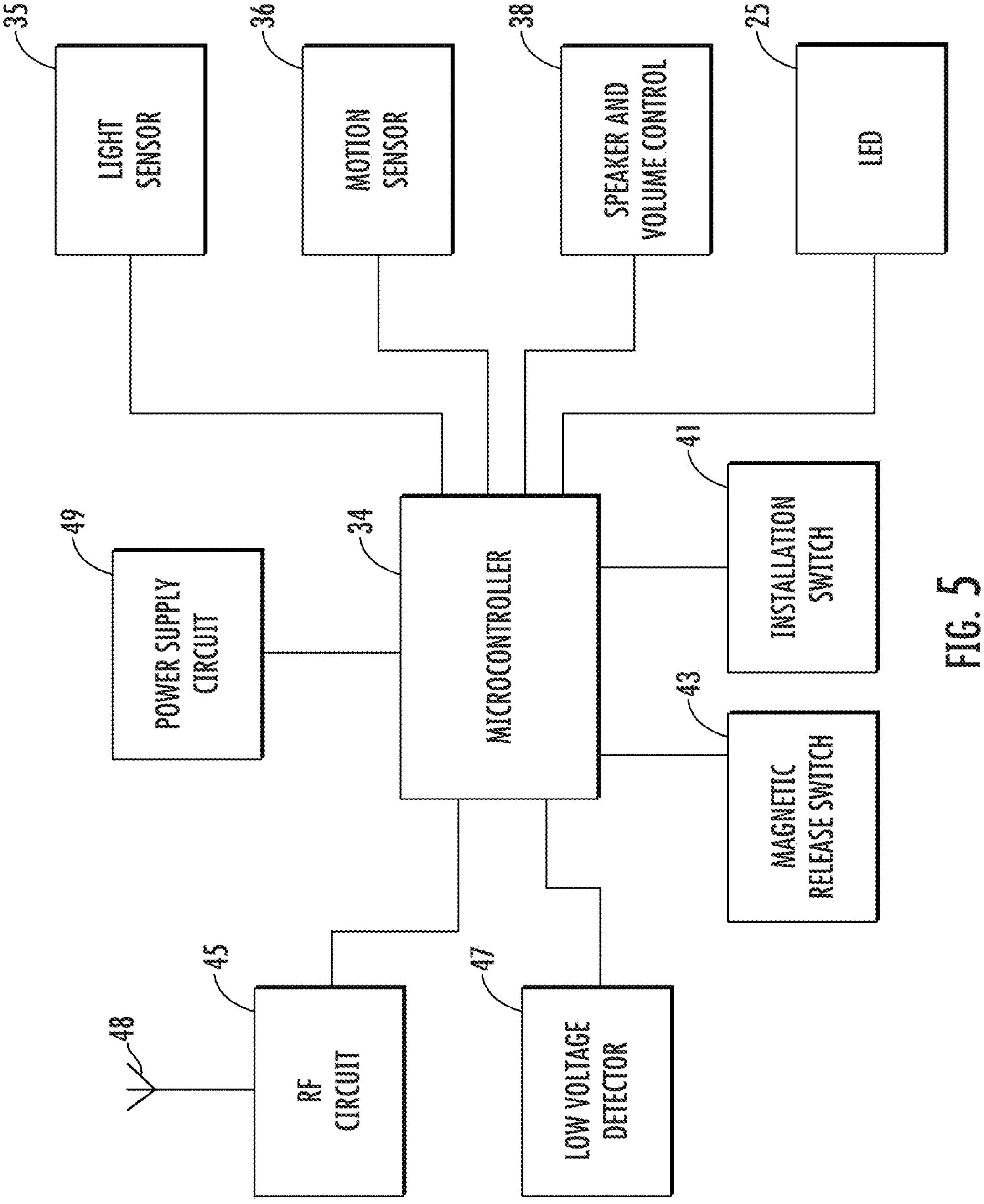
FIG. 5 is a block diagram showing the electronic circuitry incorporated in the retail anti-theft device, in accordance with an embodiment of the invention.

FIG. 5 is a block diagram showing the electronics housed within the merchandise tag 20. The merchandise tag electronics include a microcontroller 34 that is electrically coupled to a light sensor circuit 35 and an emitter circuit that operates a speaker 38 and the LED 25. The microcontroller 34 is also electrically coupled to a motion sensor circuit that includes a motion sensor 36. The motion sensor 36 may be a piezoelectric sensor, or any similarly suitable type of motion sensor 36.

In the embodiment shown, the microcontroller 34 is electrically coupled to the emitter 26 (see FIG. 1), motion sensor 36, and light sensor 24. In one embodiment, the microcontroller 34 is in operative communication with the emitter 26, motion sensor 36, and light sensor 24, but the microcontroller 34 is not physically coupled to the emitter 26, motion sensor 36, and/or light sensor 24. In another embodiment, the microcontroller 34 is coupled to the emitter 26, motion sensor 36, and light sensor 24 by electrical leads. For purposes of this disclosure, "coupled" includes mechanically coupled, electrically coupled, in operative communication, etc.

Furthermore, the microcontroller 34 is electrically coupled to the installation switch 41, also shown as SW1 on FIG. 5, and the decode switch 43 also shown as SW3 on FIG. 5. The table below provides a status and series of exemplary responses for the microcontroller 34 with respect to various "ON-OFF" combinations of the switches SW1 and SW3. These combinations, and the possible actions of the microcontroller 34 in response thereto, are described in more detail below. However, it should be noted that the microcontroller 34 is not limited to only the responses shown.

TABLE 1

Switch combination status of SW1 and SW3

| Item | Product status | SW1 (Installation switch) | SW3 (Decode switch) | Status indicate | Remark |
|---|---|---|---|---|---|
| 1 | Not used | OFF | OFF | No | |
| 2 | Installed | ON(>10 seconds) | OFF | Long "Beep" | |
| 3 | Normal used | ON(>3 minutes) | OFF | No | |
| 4 | Cable loosed | ON | ON | "Alarm" | SW3 is turned on for 0.6 seconds, SW1 is still ON |
| 5 | Alarm | OFF | OFF | "Alarm" | SW1 is turned from ON to OFF for 0.6 seconds, SW3 is still OFF |
| 6 | Decode | OFF | ON | Long "Beep" | SW3 is turned on for 0.6 seconds |

As is further described below, the microcontroller 34 is configured to determine from the light sensor 24 and motion sensor 36 when the merchandise tag 20, and thus the merchandise product to which it is attached, is in low light and in motion, indicating a potential theft condition. The microcontroller 34 of FIG. 5 is also configured to transmit alarm data to a remote location via an RF circuit 45, and configured to detect low voltage via a low voltage detection circuit 47. A power supply circuit 49 is configured to provide a constant 3 volts to the microcontroller 34. It is understood that, in other embodiments, the supply voltage may be greater or lesser than 3 volts.

In an exemplary embodiment of FIG. 5, the microcontroller 34 is a 20-pin integrated circuit. The following description provides one example of how such a microcontroller 34 could be used in embodiments of the invention shown herein. For example, power may be supplied to a first pin, while a second pin is connected to ground. In this example, a third pin is connected, via the emitter circuit, to the LED 25 and to the speaker 38, and thus controls the emission of audio and visual warnings from the merchandise tag 20. A fourth pin is connected, via a motion sensor circuit to motion sensor 36. When motion is detected by motion sensor 36, a pulsed signal is provided to the fourth pin, which causes the microcontroller 34 to supply power to a fifth pin that activates the light sensor circuit 35. When light is detected by the light sensor 24, the signal voltage supplied to a sixth pin is low. When no light is detected by the light sensor 24, the signal voltage supplied to the sixth pin is high. As will be explained in more detail below, when the signal to the fourth pin indicates that the merchandise tag 20 is in motion, the signal on the sixth pin allows the microcontroller 34 to determine if the merchandise tag 20 enters into pre-alarm mode, or continues to monitor for motion and light in order to determine whether to issue an alarm.

In alarm mode, in addition to the audio and visual alarms provided by the merchandise tag 20, an RF signal may be transmitted via a seventh pin, which is connected to the RF circuit 45. The RF circuit 45 has an antenna 48 which allows for wireless transmission of the alarm signal to a remotely-located receiver. In this case, the receiver may be any device capable of receiving the RF transmission and through which a user can recognize the purpose of the transmission. However, it is also envisioned that, in particular embodiments of the invention, the transmission of the alarm signal may occur via wired means.

In this example, the microcontroller 34 includes eighth and ninth pins which are connected to the low-voltage detection circuit 47, which monitors the supply voltage to the microcontroller 34 and provides a warning if the supply voltage drops below a threshold voltage. The high supply voltage signal on the eighth pin activates the low-voltage detection circuit 47. When the supply voltage is above the threshold voltage, the voltage on the ninth pin is low. When the supply voltage drops below the threshold voltage, the voltage on the ninth pin is high. In a particular embodiment, the microcontroller 34 activates the low-voltage detection circuit 47 once every 30 minutes, though in other embodiments the low-voltage detection circuit 47 is activated more, or less, frequently. If a certain number of successive measurements (e.g., from two to five) indicate a low supply voltage, the microcontroller 34 can indicate an audio and corresponding visual warning to the user that the supply voltage is below the required level.

Embodiments of the merchandise tag 20 may be controlled according to various methods, as will be further described below. In one scenario, the merchandise tag 20 is coupled to a merchandise product and activated by fastening the conductive strap 22 around the product and inserting the end of the strap into the merchandise tag 20 to close the installation switch (SW1) 41. Activation of the merchandise tag 20 refers to activation of the light and motion sensors 24, 36 via the aforementioned light sensor and motion sensor 35. When the light sensor 24 detects a light level below a predetermined light level, and the motion sensor 36 detects movement of the merchandise tag 20 for more than a predetermined time period with no change in the light level, the microcontroller 34 controls the emitter 26 to emit an alarm signal.

Figure 6:
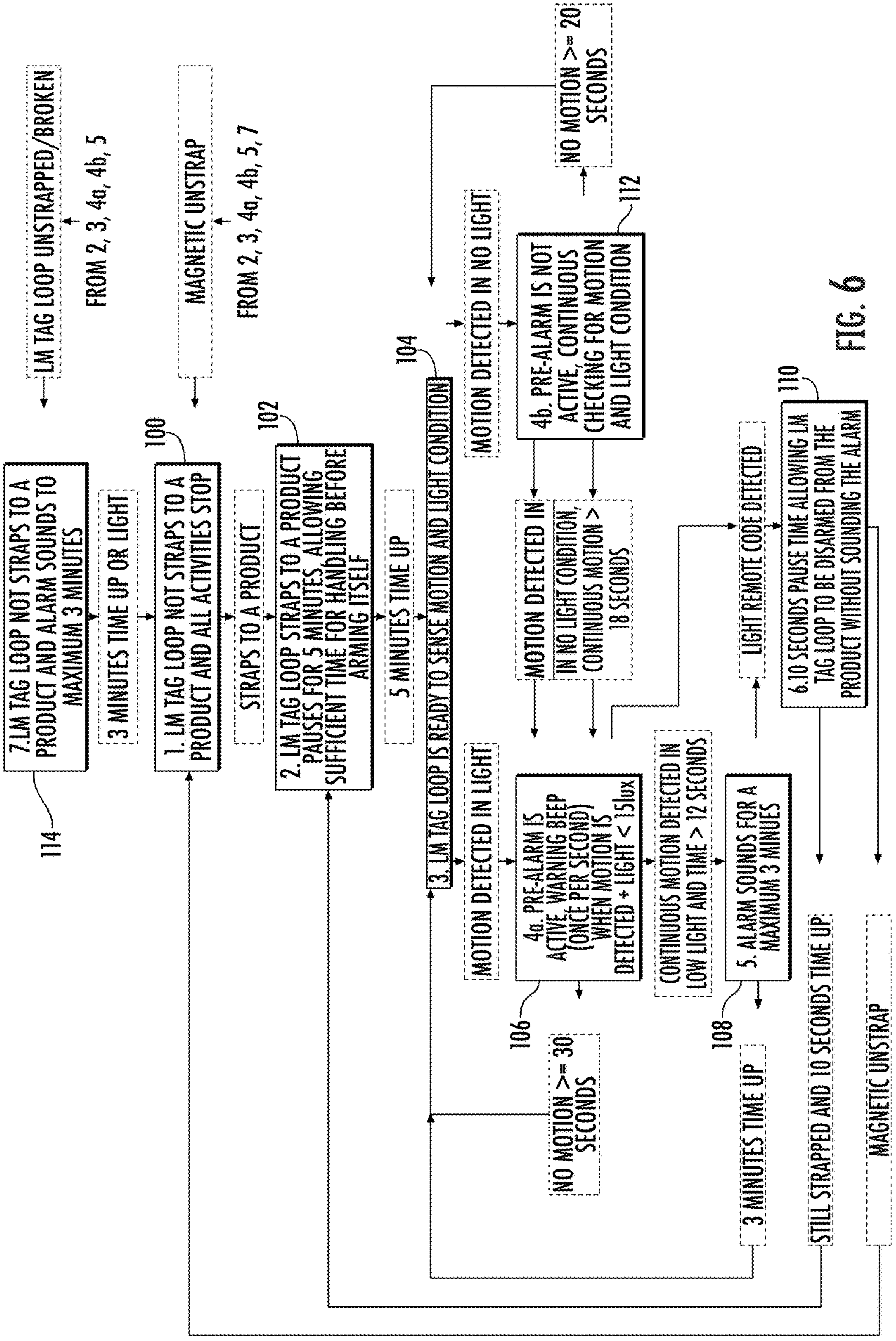
FIG. 6 is a flowchart describing the operations of the retail anti-theft device, in accordance with an embodiment of the invention.

With reference to FIG. 6, a flow diagram shows an embodiment of a method for controlling an embodiment of the merchandise tag 20 illustrated in FIGS. 1-5. However, it is envisioned that the method illustrated in FIG. 6 may be used to control alternate embodiments of the merchandise tag 20.

In the embodiment of FIG. 6, the microcontroller 34 determines, from the status of SW1 and SW3, that the s conductive trap 22 of the merchandise tag 20 has not been installed on a merchandise product (step 100). The result is that the microcontroller 34 initiates no action. In the next step, the microcontroller 34 determines from the status of SW1 and SW3 that the conductive strap 22 of the merchandise tag 20 has been installed on, or secured to, a merchandise product (step 102). In a particular embodiment, when the installation switch (SW1) 41 is closed for a first predetermined period of time, e.g., from 5 to 30 seconds, the microcontroller 34 determines that the merchandise tag 20 has been installed.

Closure of the installation switch (SW1) 41 may be accompanied by an audio and/or visual warning. For example, the emitter 26 of the merchandise tag 20 may emit one long beep and/or flash of the LED 25 at the end of the first predetermined period of time. If the installation switch (SW1) 41 remains closed for a second predetermined period of time, e.g., from 3 to 10 minutes, the microcontroller 34 enters its normal working state in which its light and motion sensors are activated while the microcontroller 34 goes into a sleep mode (step 104).

The microcontroller 34 remains in sleep mode until the motion sensor 36 detects motion. If motion is detected and the light sensor 24 detects normal light conditions, the microcontroller 34 enters a pre-alarm mode (step 106), which may be accompanied by an audio warning. In one example, the emitter 26 emits a periodic beep (e.g., one beep per second) that signals the pre-alarm mode, and which may be accompanied by a corresponding flashing of the LED 25. If the motion stops and no further motion is detected for some period (e.g., from 15 to 60 seconds—the period shown in FIG. 6 is 30 seconds), the microcontroller 34 resets to step 104 entering a normal working state in which its light and motion sensors are activated while the microcontroller 34 goes into a sleep mode.

However, if the motion sensor 36 detects continued motion and the amount of light detected by the light sensor 24 drops below some threshold level, the merchandise tag 20 will go into alarm mode. In a particular example, alarm mode may be triggered by continuous motion for some time period (e.g., from 8 to 20 seconds—the period is 12 seconds in FIG. 6 embodiment) while in pre-alarm mode, along with a detected light level below 15 lux, for example. Alarm mode may be indicated by a rapid beeping from the emitter 26 and a correspondingly rapid flashing of the LED 25 (step 108). These audio and visual warnings may continue for 2 to 10 minutes. In the embodiment of FIG. 6, the alarm warnings continue for a maximum of 3 minutes. After the maximum alarm period expires, the microcontroller 34 resets to step 104 entering a normal working state in which its light and motion sensors are activated while the microcontroller 34 goes into a sleep mode.

If the motion sensor 36 detects continued motion and the amount of light detected by the light sensor 24 remains bright, the microcontroller 34 will pause for some relatively short period (e.g., from 5 to 20 seconds—the period is 10 seconds in FIG. 6 embodiment) (step 110). During this period, the merchandise tag 20 can be deactivated. Following deactivation of the merchandise tag 20, the light and motion sensors 24, 36 are inactive until the merchandise tag 20 is reactivated. Deactivation of the merchandise tag 20 could occur if the merchandise product is moved by a paying customer or a store employee so that the merchandise tag 20 can be removed prior to purchase.

If the merchandise tag 20 is deactivated and the conductive strap 22 is removed from the merchandise product, the microcontroller 34 resets to step 100 and all activities cease. If the merchandise tag 20 is deactivated and the conductive strap 22 is not removed from the merchandise product during the time period of the pause, the microcontroller 34 resets to step 102 such that if the installation switch (SW1) 41 remains closed for a predetermined period of time, e.g., from 3 to 10 minutes, the microcontroller 34 enters its normal working state in which its light and motion sensors are activated while the microcontroller 34 goes into sleep mode.

In an alternative scenario, if, after step 104, the motion sensor 36 detects motion and little or no light is detected by the light sensor 24, the microcontroller 34 continuously monitors for movement and light levels (step 112). If the motion discontinues for some predetermined time period, the microcontroller 34 resets to step 104 entering a normal working state in which its light and motion sensors are activated while the microcontroller 34 goes into a sleep mode.

In certain embodiments, once the microcontroller 34 has determined that the merchandise product is in motion, the microcontroller 34 monitors the light level and motion of the merchandise tag 20 to determine whether to control the emitter 26 to emit an alarm signal (e.g., the microcontroller 34 monitors the input from the light sensor 24 to determine whether the merchandise product is in a low-light environment and monitors the input from the motion sensor 36 to determine whether the merchandise product is also in motion).

The microcontroller 34 may be configured to wait for a predetermined period, similar to a countdown time, before causing the emitter 26 to emit a signal if the light level sensed by the light sensor 24 is below a threshold level, or if motion is detected by the motions sensor 36. The countdown time typically lasts from five seconds to 30 seconds. In the embodiment of FIG. 6, the countdown period is 18 seconds. If the product remains in motion during the countdown period, the microcontroller 34 enters pre-alarm mode (step 106) and proceeds as described above.

In particular embodiments, when the microcontroller 34 determines that the merchandise tag 20 is both in a low-light environment and in motion for a predetermined amount of time, e.g., the merchandise tag 20 and attached merchandise product is being concealed by a thief moving towards an exit, for example, the microcontroller 34 controls the emitter 26 to emit an alarm signal, including audio and visual warnings as described above.

It should also be noted that, in some embodiments, if the conductive strap 22 is cut (i.e., SW1 turns off) or loosened, for example such that the merchandise tag 20 can be removed from the merchandise product, the microcontroller 34 controls the emitter 26 to emit an alarm signal, including audio and visual warnings as described above (step 114). In this context, the conductive strap 22 being "cut" means being severed completely into separate pieces. Once the alarm signal sounds for the predetermined maximum time period, the microcontroller 34 ceases all activities and resets to step 100.

Whether in alarm mode or pre-alarm mode, the merchandise tag 20 may be deactivated magnetically. As explained above, when the conductive strap 22 is secured to a merchandise product and inserted into the SW1 opening in housing 28, the installation switch 41 is closed and SW1 is turned on. When a magnet is placed in close proximity to the decode switch 43, SW3 is closed or turned on and SW1 is opened or turned off. In the context of the present invention, "close proximity" means when the magnet is less than one foot from the housing 28. Deactivation of the merchandise tag 20 may be accompanied by an audio and/or visual warning. For example, the emitter 26 of the merchandise tag 20 may emit one long beep and/or flash of the LED 25 to signal to the user that the merchandise tag 20 is no longer in alarm mode or pre-alarm mode.

Following deactivation, the conductive strap 22 may be released from the merchandise product and removed from the SW1 opening in housing 28. In this case, the microcontroller 34 resets to step 100 and all activities cease. If the conductive strap 22 remains secured to the merchandise product and SW1 remains on or closed, the microcontroller 34 resets to step 102 such that if the installation switch (SW1) 41 remains closed for a predetermined period of time, e.g., from 3 to 10 minutes, the microcontroller 34 enters its normal working state in which its light and motion sensors are activated while the microcontroller 34 goes into sleep mode.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A theft detection device configured to be coupled to a merchandise product, the theft detection device comprising:

a housing with a first end of an electrically conductive strap attached to the housing, the housing having an opening for a second end of the conductive strap, the conductive strap configured to secure the theft detection device to the merchandise product, wherein the theft detection device is activated when the second end of the conductive strap is inserted into the opening;

a light sensor disposed within the housing, the light sensor configured to sense an amount of light shining on the theft detection device;

a motion sensor disposed within the housing, the motion sensor configured to sense movement of the theft detection device;

an emitter disposed within the housing, the emitter configured to provide audio signals to a user;

a microcontroller disposed within the housing, and coupled to the light sensor, motion sensor, and emitter, the microcontroller configured to control the emitter to emit an alarm signal based on data from the light and motion sensors, the microcontroller further configured to cause the emitter to emit the alarm signal when the conductive strap is cut or loosened from the merchandise product; and a decode switch which, when closed, opens an installation switch to deactivate the theft detection device.

2. The theft detection device of claim 1, further comprising an installation switch which is closed when the conductive strap is inserted into the opening.

3. The theft detection device of claim 2, wherein the installation switch is opened when the conductive strap is cut.

4. The theft detection device of claim 1, wherein the decode switch is configured to be closed magnetically.

5. The theft detection device of claim 4, wherein a movable metal gear is configured to overcome a force of a spring in order to disengage the movable metal gear from the conductive strap in response to a magnet placed outside of the housing in proximity to the movable metal gear.

6. The theft detection device of claim 5, wherein the conductive strap comes into electrical contact with a second metal contact when the movable metal gear disengages from the conductive strap.

7. The theft detection device of claim 1, further comprising an RF circuit configured to transmit the alarm signal to a remote receiver.

8. The theft detection device of claim 7, wherein the RF circuit is configured to wirelessly transmit the alarm signal to the remote receiver.

9. The theft detection device of claim 1, wherein the alarm signal includes both an audio signal and a visual signal.

* * * * *